UNITED STATES PATENT OFFICE.

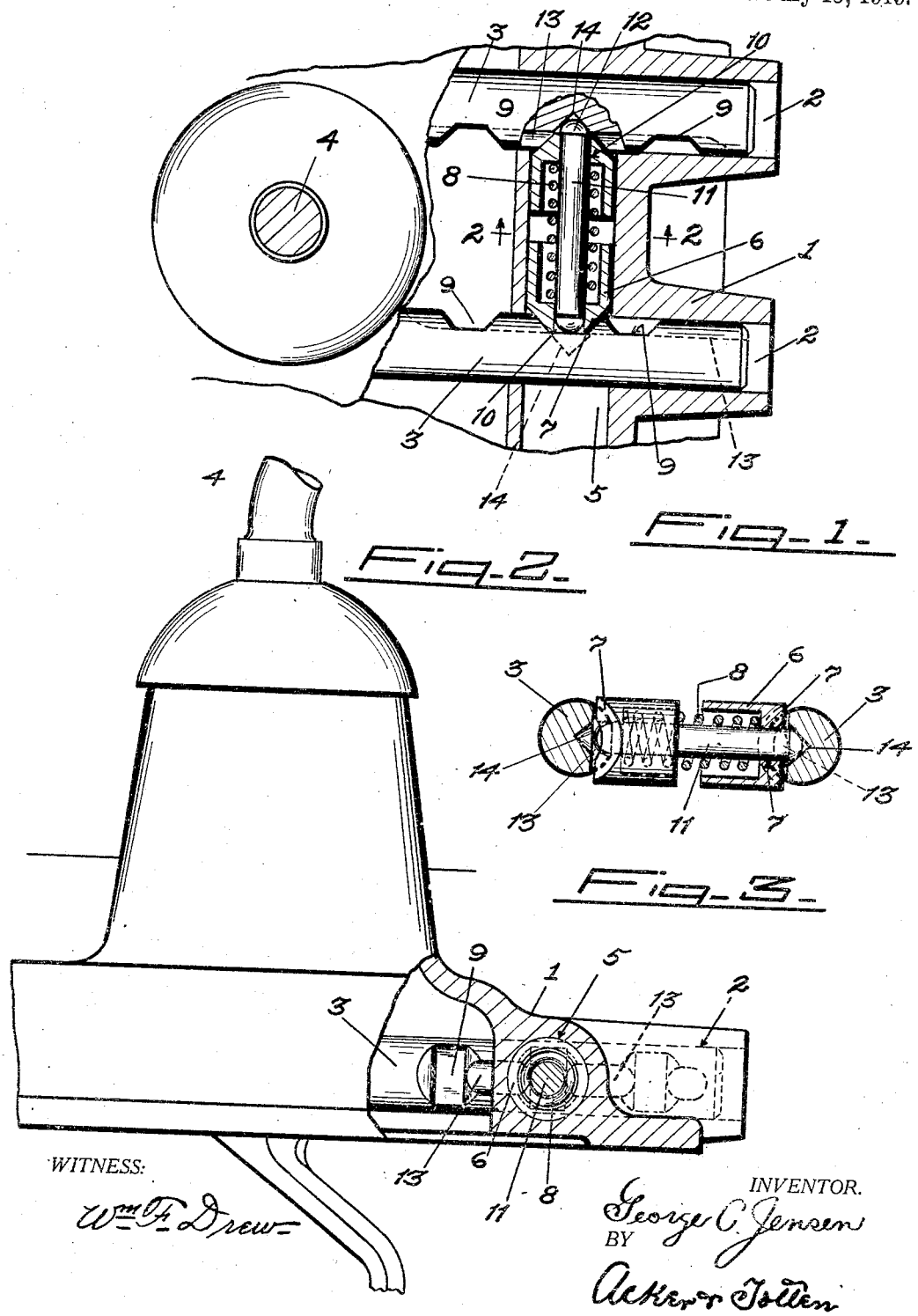

GEORGE C. JENSEN, OF OAKLAND, CALIFORNIA.

COMBINED SHIFT LOCK AND RETAINER.

1,309,852.　　　Specification of Letters Patent.　　Patented July 15, 1919.

Application filed August 20, 1918. Serial No. 250,657.

*To all whom it may concern:*

Be it known that I, GEORGE C. JENSEN, a citizen of the United States, residing at Oakland, in the county of Alameda and State of California, have invented certain new and useful Improvements in Combined Shift Locks and Retainers, of which the following is a specification.

The present invention relates to an improved retainer and interlock for the shifter devices or rods of an automobile gear shift mechanism.

Heretofore it has been the practice in constructions of this type to provide an interlock lying between the rods or devices, and to provide the yieldable retaining members, one at each opposite side of the rods or devices, thus requiring a number of elements in the manufacture and construction of these installations.

My present invention has for its principal objects to provide a construction of this type consisting of very few parts, the one illustrated having four, and wherein the interlock member is received within the retaining members, the unit being placed in operative position at one time.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in plan, partly in section, illustrating the preferred embodiment of my invention as applied to the gear shift rods of a motor vehicle gear transmission.

Fig. 2 is a view in side elevation, partly in section, that portion in section being taken on line 2—2 of Fig. 1.

Fig. 3 is a view in detail illustrating the interlock in operative position on the movement of one of the shifter rods from normal position.

Referring more particularly to the drawings, wherein like characters of reference designate corresponding parts, 1 indicates a suitable housing or member provided with the parallel bores 2 in which are slidably mounted the shift devices or rods 3 for controlling the motor vehicle transmission, said devices or rods being independently operated on the movement of a suitable lever 4, of any suitable type adapted for this purpose.

The housing or member 1 is formed with a bore 5 extending at right angles to the bores 2 and disposed between the same, said bore 5 being open at one end, and within the same, when one of the rods or shifter devices 3 will permit access to that portion thereof lying between the shifter devices, is inserted the interlock and retaining mechanism hereinafter set forth.

The retaining members are preferably in the form of cylindrical cups or shells 6 formed with a tapered outer end 7 and between the inner ends thereof is positioned the coiled spring 8 for forcing said retaining members outwardly into contact with the adjacent walls of the shifter devices or rods 3. The shifter devices or rods 3 are provided in their adjacent surfaces with stops or recesses 9 arranged throughout the length thereof in position to correspond to the gear intermeshing positions to which said rods are moved during their operation in the changing of speed gear relations of the transmission.

The retaining members are of such length that a sufficient space is provided between the inner adjacent ends thereof as to permit movement of one of said devices inwardly on the movement of one of the shifter devices to displace the outer tapered end 7 thereof from its coöperating stop 9. Thus it will be apparent that the spring 8 which forces said retaining member 6 outwardly or apart, yieldably retains the tapered ends thereof in coöperation with the stops and yieldably retains the shifter devices in their adjusted position. The retaining members 6 are provided in their outer ends with the axially disposed bores 10 arranged in alinement, and within which operate the opposite ends of the interlocking pin or member 11 around which the spring 8 is coiled, said member being preferably formed with the spherical ends 12. The rods or shifter devices 3 are formed in their adjacent faces with the longitudinal grooves 13 preferably of a depth corresponding to that of the stops 9, and extending into said shifter devices from the base of said grooves are the interlock recesses 14 arranged in such manner in the rods that the same lie opposite each other when the transmission gears are in neutral position.

The interlocking pin 11 is of such length that on the movement of one of said rods or devices 3 from neutral position, the end of the pin coöperating with said rod will be forced from its notch and caused to ride on the surface of the groove 13 thereof, projecting the opposite end of said pin into its coöperating notch or recess, thereby locking the other shifter device against operative movement and in its neutral position.

It is apparent in this construction that the interlock and retaining members are both mounted within the same bore, which materially reduces the cost of construction below that of devices for this type now in use. Also that the shift devices are provided with notches, stops or recesses in the adjacent walls thereof which are capable of formation at little cost.

Having thus described my invention, what I claim as new and desire to protect by Letters Patent is:—

1. In combination with a pair of spaced movable shifter devices provided in their adjacent surfaces with stops, a member through which said devices operate and provided with a bore connecting said devices, a member within said bore for coöperating with said stops to provide an interlock between said shifter devices, whereby one device is locked from movement on the movement of the other device, and a pair of retainer devices within said bore for retaining said shifter devices in their set position.

2. In combination with a pair of spaced shifter devices capable of independent longitudinal movement, of a pair of spring pressed devices positioned between said shifter devices, said devices held from movement with said shifter devices and capable of movement angularly thereto for retaining the shifter devices in their adjusted position, and means independent of said spring pressed devices and also positioned between said shifter devices in line with said spring pressed devices for locking one of said shifter devices from movement on the movement of the other from normal position.

3. In combination with a pair of spaced shifter devices capable of independent longitudinal movement, of a pair of spring pressed plungers mounted between said devices for coöperating with the same to retain said shifter devices in their adjusted position, and an interlock positioned between said shifter devices in the region of said plungers, said interlock adapted for forcing into locking engagement with one of said shifter devices on the movement of the other shifter device from normal position.

4. In combination with a pair of spaced shifter devices capable of independent longitudinal movement, of a guide extending between the same and arranged at an angle thereto, said device provided on adjacent faces with recesses, certain of which normally lie opposite each other, a pair of spring pressed retaining members within said guide and capable of engagement with certain of said recesses to retain said devices in their adjusted position, and an interlock within said guide for coöperating with said recesses lying opposite each other, whereby on the movement of one of said shifter devices from normal position the said interlock provides a connection between said guide and the other shifter device to prevent operative movement of the latter.

5. In combination with a pair of spaced shifter devices capable of independent longitudinal movement, of a guide extending between the same and arranged at an angle thereto, said devices provided on adjacent faces with recesses certain of which normally lie opposite each other, a pair of spring pressed retaining members within said guide and capable of engagement with certain of said recesses to retain said devices in their adjusted position, and an interlocking pin longitudinally movable within said guide and for coöperating at its opposite ends with said recesses lying opposite each other, said pin adapted on the movement of one of said shifter devices from normal position to engage the notch of the other shifter device and thus preclude operative movement of said shifter device until such time as said operated shifter device is returned to normal position.

6. In combination with a pair of parallel spaced movable shifter devices provided in adjacent faces with a plurality of stops, a pair of spring pressed retaining lugs positioned between said devices for engagement with said stops to retain said devices in their set position, said lugs being each provided with a bore arranged in alinement, and an interlocking member freely movable within said bores, said devices being each further provided on adjacent faces with a recess adapted to normally lie opposite each other for the reception of one end of said interlocking member on the movement of the shifting device adjacent the opposite end of said interlocking member, whereby one of said shifter devices is locked from movement on the movement of the recess of the other from normal position.

7. In combination with a wall provided with a pair of spaced bores, a shifter rod longitudinally movable within each of said bores and capable of independent operation, said rods provided on their adjacent faces with a plurality of stops and further provided with a longitudinal groove extending the depth of said stops and formed with a recess in said groove, the recesses of adjacent rods normally lying opposite each other, said wall being further provided with a bore connecting said rod receiving bores and providing a guide, a pair of retaining plungers within said guide and formed with a bore extending therethrough, a spring positioned between said plungers for yieldably maintaining the outer ends thereof in engagement with said stops to retain said rods in their adjusted position, an interlocking pin longitudinally movable through the bores within said plungers and of a length slightly greater than the distance between said longitudinally extending grooves whereby on the operation of one of said rods to move the recess therein out of register with the recess of the opposing rod said plunger will be projected into the recess of the opposing rod with its opposite end riding on the surface of said groove of the operated rod, whereby said opposing rod is locked from movement until such time as the operated rod is returned to normal position.

In testimony whereof I have signed my name to this specification in the presence of two subscribing witnesses.

GEORGE C. JENSEN.

Witnesses:
HARRY A. TOTTEN,
D. B. RICHARDS.